(12) United States Patent
Guddanti

(10) Patent No.: US 7,072,066 B2
(45) Date of Patent: Jul. 4, 2006

(54) SYSTEM AND METHOD FOR SAVING POWER USING PRIORITY PRINTING

(75) Inventor: Srinivas Guddanti, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 374 days.

(21) Appl. No.: 10/611,284

(22) Filed: Jun. 30, 2003

(65) Prior Publication Data

US 2004/0095599 A1 May 20, 2004

Related U.S. Application Data

(62) Division of application No. 10/109,925, filed on Mar. 29, 2002, now Pat. No. 6,883,980.

(51) Int. Cl.
*G06F 15/00* (2006.01)
*B41J 5/30* (2006.01)

(52) U.S. Cl. .................. 358/1.15; 358/1.14; 358/1.16; 400/61; 400/62; 400/76

(58) Field of Classification Search ............... 358/1.15, 358/1.16; 400/60
See application file for complete search history.

(56) References Cited

U.S. PATENT DOCUMENTS 5,327,526 A * 7/1994 Nomura et al. ............ 358/1.16

* cited by examiner

*Primary Examiner*—Twyler M. Lamb

(57) ABSTRACT

A method and apparatus for saving power in a printing system, by prioritizing printer jobs. Using a graphical user interface an end-user assigns a print time to a first job. The print time designation is attached to the first job and the first job is transmitted from the end-user station to a printer. Based on whether the printer is in ready state or in power save mode the first job is printed immediately or stored in memory. When the first job is stored in memory, computations are made to determine a printing time to initiate printing of the first job. The first job is then printed at the printing time or at an earlier printing time if a second job with an earlier printing time is stored in the memory.

19 Claims, 4 Drawing Sheets

| PRIORITY CODE | DELAY IN MINUTES |
|---|---|
| 0 | > 300 |
| 1 | 60 - 300 |
| 2 | < 60 |

SYSTEM AND METHOD FOR SAVING POWER USING PRIORITY PRINTING

CROSS REFERENCE TO RELATED APPLICATION(S)

This is a divisional of Ser. No. 10/109,925 filed on Mar. 29, 2002 now U.S. Pat. No. 6,883,980 which is hereby incorporated by reference herein.

BACKGROUND OF THE INVENTION

1. Field of Invention

This invention relates to printing. Specifically, the present invention relates to power savings.

2. Description of the Related Art

In modern computing environments computers are networked to share resources. For example, several computers may be networked to share the same server. The server may house resources used by each computer, such as a database or specific programs.

Sharing these resources provides for efficiencies in the network. For example, if a database is stored on one server there is no need to replicate the database information on each machine that uses the information. As a result, the amount of hardware required in the network is greatly reduced. With less hardware, tangential savings are also achieved such as power savings, since an end-user has to run fewer machines. Running fewer machines ultimately-results in financial savings.

In addition to computing devices, peripheral devices in the network are also shared. For example, conventional printers are often networked and shared by several end-users. As with computing devices, using a network printer results in end-user efficiencies, since several end-user stations share the same printer. Ultimately, this results in a savings in hardware, power and space resources required to run and house the printer. Across a large organization, this savings can be substantial.

Although sharing network printers provide efficiencies, in many ways conventional network printers still function in an inefficient manner. For example, conventional network printers operate in a power save mode when they are not in operation. In power save mode the printer runs on less power, when the printer is not printing or processing a job. When a network printer receives a print job, the printer comes out of power save mode and begins to print the job. When several jobs arrive at a network printer the jobs are printed as they are received by the printer.

If the printer is in power save mode, the printer will begin to print the first job. The printer will then place each additional job that arrives in a print queue and sequentially print the jobs from the queue. In other words a first in—first out (FIFO) algorithm is used. There is no prioritization of the jobs. With the random arrival of jobs, a conventional network printer is often cycling between operating mode and power save mode. Cycling back and forth, stops the printer from maximizing the full benefit of the power save mode. In addition, without any prioritization of jobs, end-users have limited control over how or when their jobs are printed.

There is a need in the art for a more efficient system or method for sharing a printing resource. For example, there is a need for a shared printer resource that will maximize the use of the power save mode feature. There is a need for a shared printer resource that enables the prioritization of jobs. Lastly, there is a need in the art, for shared printer resource that gives an end-user more control over how and when a print job is processed.

SUMMARY OF THE INVENTION

The need in the art is addressed by the method and apparatus for strategic printing of the present invention. In accordance with present teachings, a shared printer in power save mode receives a job for printing and switches from power save mode to a ready state. In the ready state, the printer prints jobs based on the length of the job and a priority code associated with the job. The priority code is used to look up the delay time before the printer prints the job. The delay time in conjunction with the length of the job information is then used to compute the printing time for the job. When the delay time is less than the printing time the job is printed.

In an alternate embodiment of the present invention a printer in the power save mode receives a first print job that includes information on the length of the job information and priority code information. The printer once again calculates the printing time and if it is not time for printing, stores the print job in memory. When the printer receives a second print job with higher priority code information, the printer prints all the jobs stored in memory when it is time to print the second print job with the higher priority code information. In a third embodiment, if there are several print jobs in memory, the printer will print all of the jobs in memory regardless of their priority code when the first print job stored in the memory is ready for printing. Finally, in a fourth embodiment of the present invention, the printer is in the ready state, so the job is printed irrespective of the priority code.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
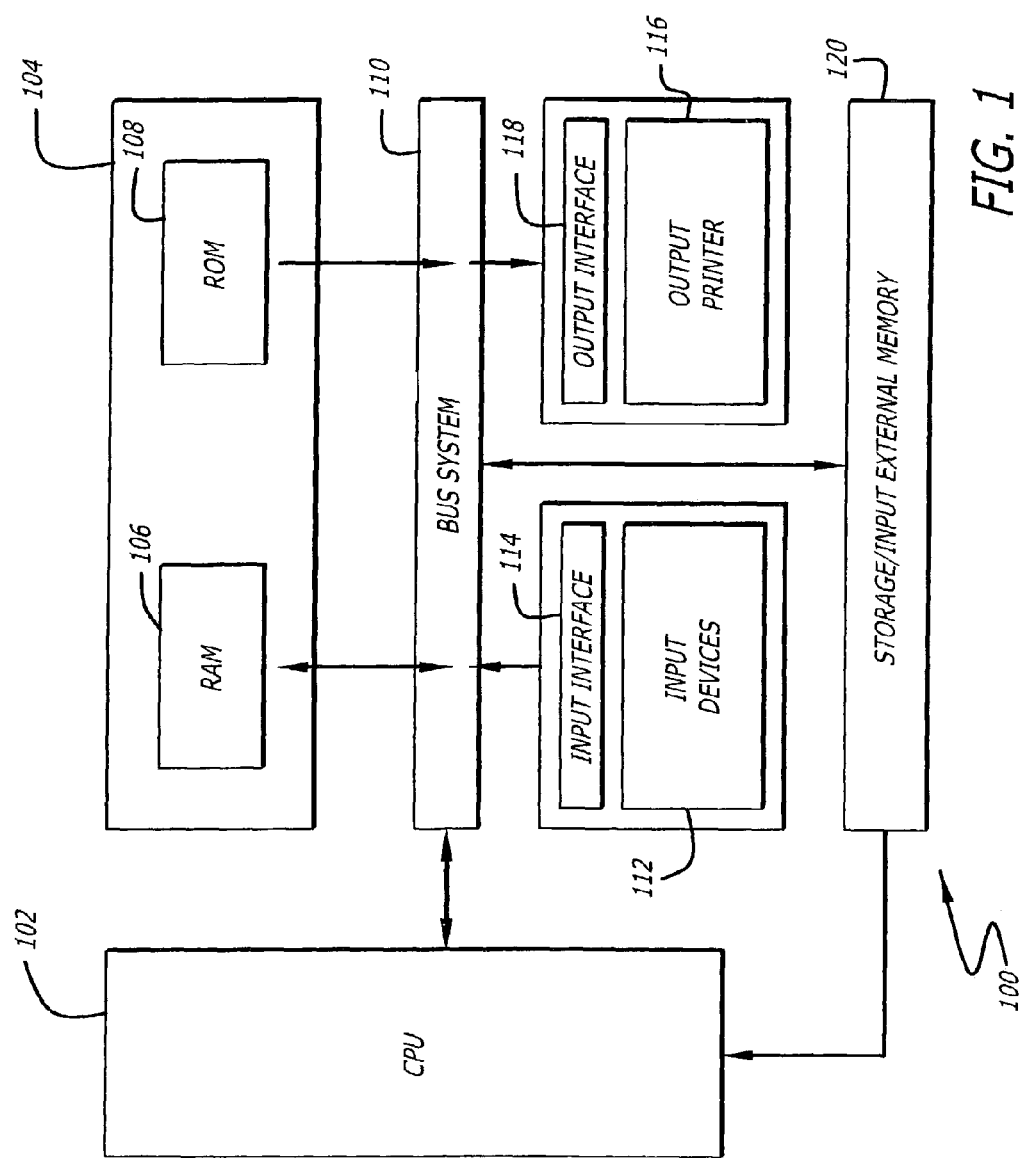
FIG. 1 is a system diagram of the present invention.

FIG. 1 is a block diagram of an illustrative embodiment of a system implemented in accordance with the teachings of the present invention. As shown in FIG. 1, the system 100 includes a central processing unit (CPU) 102. Internal memory 104 is included which provides random access memory 106 for staging information and a read only memory 108 for storing computer instructions. The CPU 102 accesses information in the RAM 106 and the ROM 108 through a standardized communication pathway or a bus 110. Input devices such as a keyboard, a mouse, a joy stick, a scanner and a light pen are also shown as 112. Communication between the input device 112 and other parts of the system, is accomplished through an input interface 114 and the bus 110. Output devices include a monitor (not shown) and a printer 116. Communication between the output devices and other parts of the system, is accomplished through the bus 110 and an output interface 118. External memory 120 is also shown. External memory 120 may include a floppy disk drive, a hard disk drive, a CD ROM or a magnetic tape.

In accordance with an illustrative embodiment of the method of the invention, a number of print jobs may arrive at the printer and be stored in a queue, in internal memory 104 or external memory 120. Computer instructions for processing the print jobs in accordance with the present invention are stored in internal memory 104 (e.g. ROM 108). As print jobs come into the memory (104, 120), the CPU 102 processes the print jobs in accordance with the computer instructions (software) stored in ROM 108.

In the method of the present invention several print jobs may arrive and be stored in the memory (104, 120). The CPU 102 processes the print jobs under control of the software. In accordance with the present teachings, the CPU 102 executes the computer instructions and reorganizes the priority or order of the print jobs.

Figure 2:
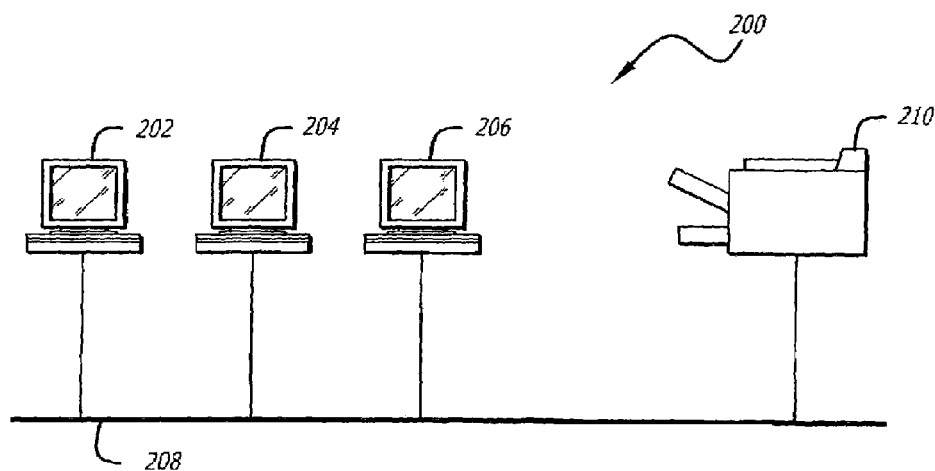
FIG. 2 is a conceptual drawing of a network implementing the method and apparatus of the present invention.

FIG. 2 shows a Local Area Network 200 adapted to utilize the teachings of the present invention. It should be appreciated that a printer implementing the teachings of the present invention may be a shared printer of any type regardless of whether the printer is shared across a network (e.g. Local Area Network or internet) or if the printer is shared as a result of a direct connection to several end-users.

In FIG. 2 computers 202, 204 and 206 communicate across a shared communications path 108 with a shared printer 100 such as that shown in FIG. 1. The computers 202, 204, 206 are each independent devices. Each of the computers is capable of sending a print job at any time. The shared printer 100 operates in both an operating mode and a power save mode. In the operating mode the printer 100 is fully functional and power is supplied to the full printer circuitry and apparatus. In operating mode the printer receives print jobs and processes these jobs immediately if there are no print jobs pending. If print jobs are pending the printer stores the print job in memory until the received print job can be printed by the printer apparatus. Placing incoming jobs in memory until printer resources are available for printing creates a queue of print jobs in the memory.

When the printer is in power save mode, the full functionality of the printer is not being utilized. For example, power is applied to a subset of the printer circuitry and apparatus to save energy. When a printer receives a job in power save mode, the printer first powers up the printer circuitry and apparatus that is maintained in a standby or 'sleep' state. This places the printer in operational mode. After the printer is in operational mode, the printer prints the job as mentioned above.

Figure 3:
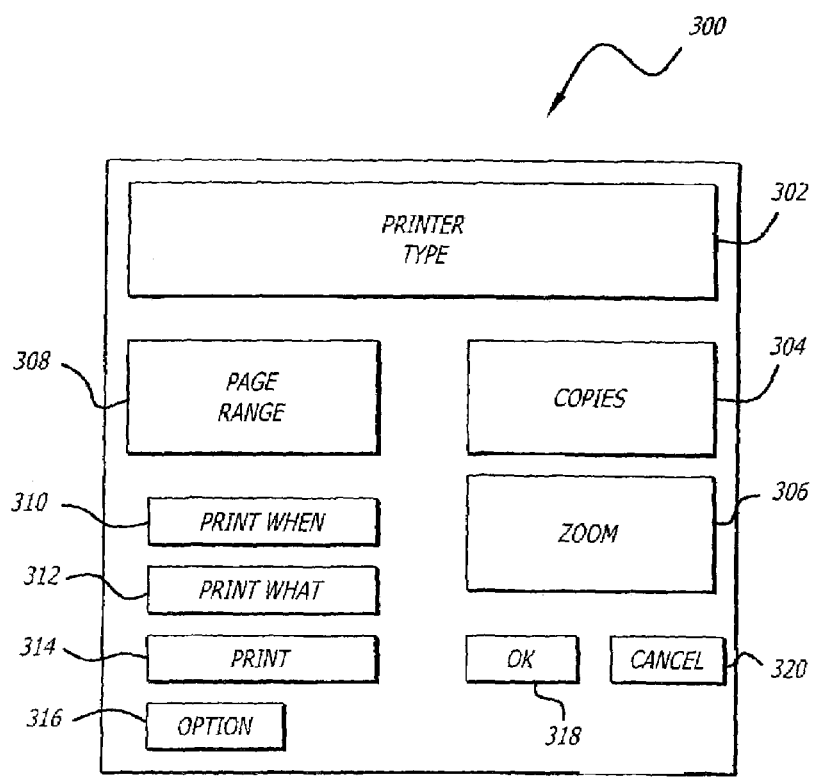
FIG. 3 is a graphical user interface of a print control screen.

FIG. 3 displays a modified graphical user interface 300 used to print documents in accordance with the inventive method. In FIG. 3 a printer type field is shown as 302. The printer type field enables an end-user to select a specific printer and change details about how the document should be printed. For example, the landscape or portrait option may be selected. A copies field is also shown as 304. The copies field 304 enables an end-user to specify or request a number of copies. A zoom field is shown as 306. The zoom field 306 enables an end-user to scale the size of the print job. A page range field 308 is shown. The page range field 308 enables an end-user to print the current page, selected pages or all the pages of a print job.

A "print when" field is shown at 310. In accordance with the present teachings, the "print when" field 310 enables the end-users to put a time requirement on the print job. For example, the end-user may be given a choice of zero seconds before printing, fifteen seconds before printing or thirty seconds before printing. In accordance with the present invention, once the user selects a "print when" designation, the print job is assigned a priority code at the end-user location and sent out to the printer. Selecting a "print when" option attaches a set of printer commands to the print job. The printer commands are sent with the print job to the printer. When the printer receives the print job, the printer interprets and processes the printer commands with the other printer command (e.g. number of copies) and processes the job accordingly.

A "print what" field 312 and a print field 314 are also shown. These two fields enable the end-user to print specific documents. An option field 316 enables an end-user to specify specific printing options. Once all the print selections have been made an OK field 318 and a cancel field 320 may be utilized. These fields enable the end-user to print the job or cancel the printing of the job.

Figures 4, 5:
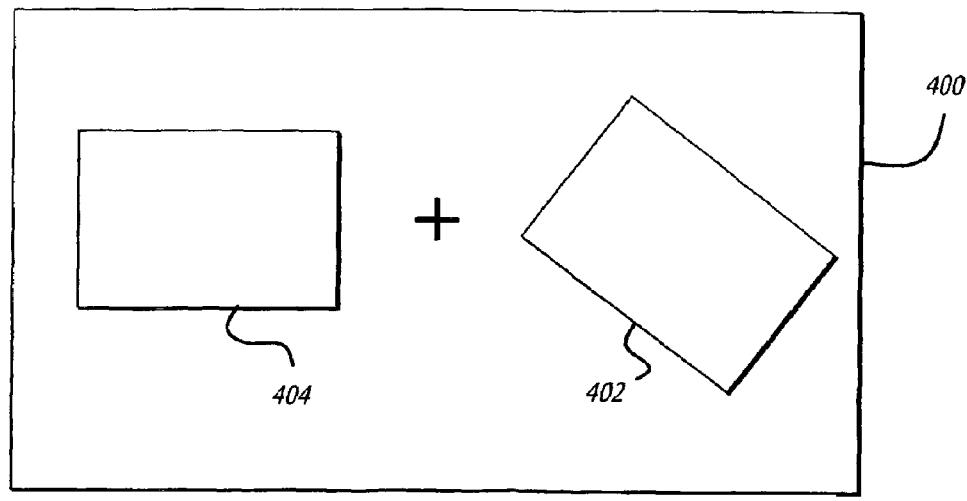
FIG. 4 is a conceptual drawing of the system setup of the present invention.
FIG. 5 is a priority code table implemented utilized in the method and apparatus of the present invention.

FIG. 4 displays a conceptual drawing 400 of the components of the presenting invention. In FIG. 4 additional instructions 402 are added to the firmware and the memory of a printer, represented by 404. The firmware includes the logic that the printer uses to process print jobs as the jobs come into the printer.

In accordance with the present teachings, additional firmware for reading and processing a priority code attached to each print job is provided. In addition, a priority code lookup table is stored in the printer memory and used in conjunction with the firmware instructions. For example, a job may arrive at the printer with priority code 2. The firmware will read-in the priority code '2' and then access the priority code table stored in the printer memory. Based on where the priority code of 2 is located in the priority code table, the firmware instructions will then process the job based on the predefined instructions stored in the firmware.

In accordance with the method of the present invention, the printer may follow a series of firmware logic steps and perform a number of activities to process a print job. For example, the printing priority may be based on the number of pages required to be printed. The logic may be established so that pages with a smaller number of pages are always printed first. Alternatively, the printing priority may be based on the time that the print job is required by the end-user. Therefore, the print jobs may be prioritized and printed based on when the end-user plans to pick up the print job from the printer. The priority may also be based on a combination of the two, such that the jobs are printed based on both the number of sheets in the print job and the time that the print job is required. It should be appreciated that a number of priority schemes may be implemented. For example, priority schemes may be based on individual users or class of users or priority schemes may be based on the type of job being printed.

FIG. 5 displays a priority code table 500 adapted for use in accordance with an illustrative implementation of the teachings of the present invention. In the present invention, the priority code table is stored in the printer memory and accessed based on the logic that is hard coded into the printer firmware. However, it should be appreciated that the priority code table or the firmware instructions may be stored in another memory, may be hard coded, soft coded or downloadable software that can be updated.

The priority code table 500 includes a priority code column 502 and a delay column 504. The priority code column includes a predefined set of priority codes. The predefined set of priority codes may be any codes defined by the user. The delay column includes the time delay before printing. The time delay values may be values based on any time scheme and separated by predefined intervals. For example, the delay may be in seconds, minutes or hours.

Each priority code is associated with a delay. For example, priority code zero as shown in 506 is associated with a delay of more than three hundred minutes as shown at 508. Priority code 1 as shown at 510 is associated with a time delay of between sixty and three hundred minutes as shown at 512. Priority code 2 as shown at 414 is associated with a time delay that is less than sixty as shown at 516.

In the method of the present invention, the time delay 508, 512 and 516 is selected by the end-user. The print job is then coded with a priority code and sent to the printer. At the printer, the firmware instructions are followed to process the priority code by reading the corresponding time delay in the priority code lookup table 500. The print job is then processed consistent with the method of the present invention.

Figure 6:
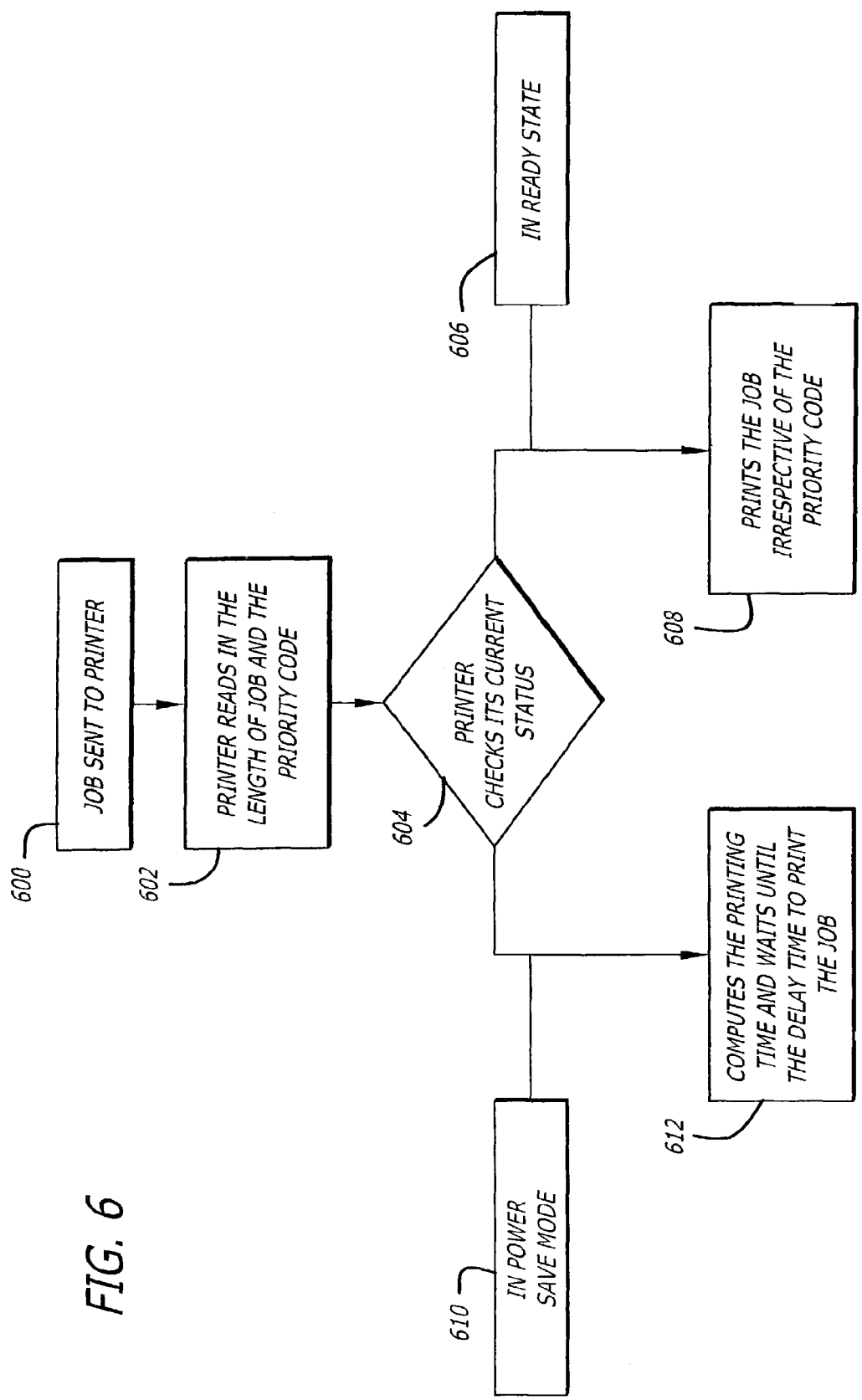
FIG. 6 is a flow diagram of the method of the present invention.

FIG. 6 displays the methodology of the present invention. A job is sent to the printer with priority information coupled to it as shown at 600. The printer then reads the length of the job (e.g. number of pages) and the priority code. The printer uses a lookup table, such as the lookup table 500 of FIG. 5, to determine the amount of time that the job can be delayed before printing, as shown at 602. The printer checks the current status (e.g. operational mode or power save mode) as shown at 604. If the printer is in the ready state as shown at 606 the job is printed irrespective of the priority code as shown at 608. If the printer is not in the ready state, but in power save mode as shown at 610, the printer analyzes the length of job and priority code input, to determine when the job should be printed as shown at 612.

In the methodology of the present invention, the printer computes the printing time based on the number of pages and waits until the delay time is less than the printing time to print the job. During this time the job is stored in the printer memory. If another print job with a higher priority code or any other job that is already in memory needs to be printed thereby bringing the printer to ready state, then all the jobs are printed irrespective of the priority code. For example, if a job was already in memory and then a job with a higher priority is subsequently stored in the memory, all the jobs in the memory will be printed when the higher priority job is printed. In addition, if a job that was already in memory reaches a point where it is time to print that job, then all of the jobs are printed irrespective of the priority code.

As an alternative to printing all the jobs in memory when one job reaches its printing time, it is possible with the method of the present invention, to reorder the printing of jobs and only print the specific job that has reached its printing time.

Furthermore, when prioritizing jobs based on classes or categories, with the method of the present invention, it is possible to reorder and print certain classes or categories of jobs before others.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A media processing device comprising:
   means for receiving a job including priority code information corresponding to a time delay requirement specified by a user for processing the job;
   means for accessing a delay time corresponding to the priority code information;
   means for determining a size of the job;
   means for computing a media processing time in response to the size; and
   means for processing the job when the delay time is less than the media processing time.

2. The invention of claim 1 wherein said means for receiving a job includes a memory.

3. The invention of claim 2 wherein said memory is random access memory.

4. The invention of claim 2 wherein said memory is external memory.

5. The invention of claim 1 wherein said means for accessing the delay time includes a memory.

6. The invention of claim 5 further including a lookup table stored in said memory.

7. The invention of claim 1 wherein said means for computing includes a priority code table.

8. The invention of claim 7 further including a memory in which said priority code table is stored.

9. A printer system comprising:
   a first memory for receiving a job including priority code information corresponding to a time delay requirement specified by a user for processing the job;
   a second memory for providing a delay time corresponding to the priority code information; and
   a processor for
   determining a size of the job,
   computing a printing time in response to the size, and
   printing the job when the delay time is less than the printing time.

10. A media processing method including:
    receiving a job relating to said media, said job including priority code information corresponding to a time delay requirement specified by a user for processing the job;
    accessing a delay time for a media processing operation, the delay time corresponding to the priority code information;
    determining a size of the job;
    computing a media processing time in response to the size;
    waiting until the delay time is less than the media processing time; and
    processing the job after the waiting is completed.

11. The invention of claim 10 wherein said media processing operation is printing.

12. The invention of claim 10 wherein said media is paper.

13. The invention of claim 10, wherein the time delay requirement is indicative of a time that the processed job is required by the user.

14. The invention of claim 10, wherein the waiting and the processing are performed if the media processing apparatus is in a power save mode so as to maximize a continuous period of time when the media processing apparatus is in the power save mode.

15. The invention of claim 14, wherein, if the media processing apparatus is not in the power save mode, processing the job without the waiting.

16. The invention of claim 14, wherein the processing the job includes exiting the power save mode and entering an operating mode, the method further including:

while the media processing apparatus is in the operating mode, processing all other received jobs regardless of the priority code information of the other received jobs.

17. The invention of claim 10, further including:

terminating the waiting in response to processing a different job.

18. The invention of claim 10, wherein the waiting includes alternatively waiting until a different job is processed.

19. The invention of claim 10, wherein the time delay requirement specified by the user is an amount of time to delay before processing the job.

* * * * *